July 1, 1930.   W. M. CHACE   1,769,621
VALVE
Filed Dec. 19, 1927   2 Sheets-Sheet 2

INVENTOR.
WILLIAM M. CHACE
BY
ATTORNEY.

Patented July 1, 1930

1,769,621

UNITED STATES PATENT OFFICE

WILLIAM M. CHACE, OF DETROIT, MICHIGAN; ADELBERT H. LINDLEY, ARTHUR COOPER, AND HILMA B. CHACE, EXECUTORS OF SAID WILLIAM M. CHACE, DECEASED, ASSIGNORS TO W. M. CHACE VALVE COMPANY, OF DETROIT, MICHIGAN, A CORPORATION OF MICHIGAN

VALVE

Application filed December 19, 1927. Serial No. 241,071.

This invention relates to valves and the object of the invention is to provide a valve which may be opened against pressure without difficulty.

Another object of the invention is to provide a valve which may be readily closed after it has been opened and which will close easily without pounding or causing what is known as "water hammer."

A further object of the invention is to provide a valve which admits water under pressure to both sides of the valve as it is first opened so that the valve may be further opened very readily.

A further object of the invention is to provide a valve of the character described arranged to admit water under pressure to both sides of the movable valve body as the valve is opened and adapted during closing to discharge the water from beneath the valve against the pressure of the inlet water which tends to close the valve.

These objects and the several novel features of the invention are hereinafter more fully described and claimed and the preferred form of construction by which these objects are attained is shown in the accompanying drawings in which—

Figure 1:
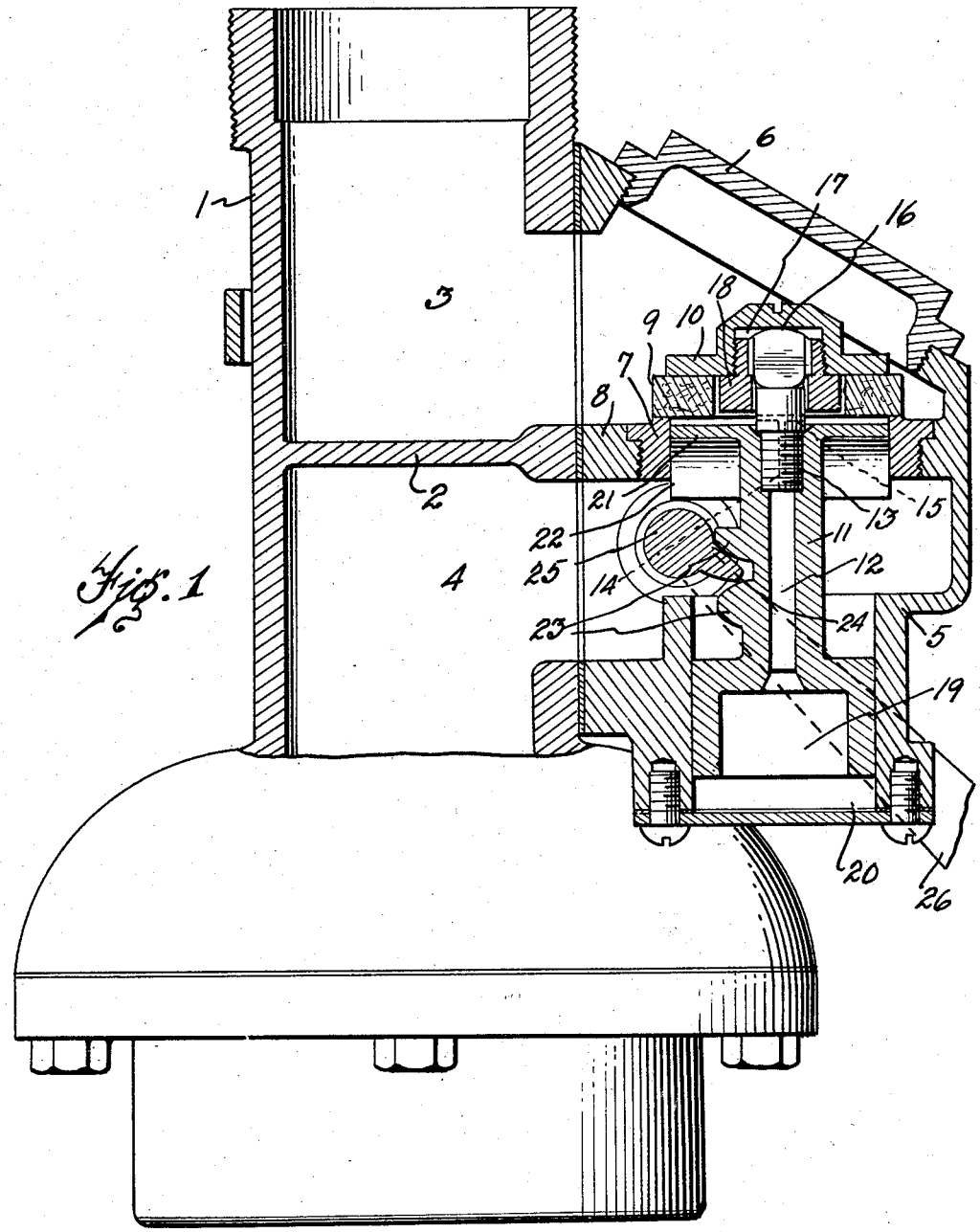
Fig. 1 is a section through a valve and housing embodying my invention and showing the valve in the closed position.

As shown in Fig. 1 an inlet member 1 is provided having a transverse partition 2 dividing the inlet into an upper chamber 3 and a lower chamber 4. The housing 5 for the valve is secured to the member 1 and a plug 6 is threaded thereinto and allows access to the valve. The valve comprises a valve seat 7 threaded into the partition 8 which is coextensive with the partition 2 in the inlet member 1. A resilient packing ring 9 is positioned on the seat and a cap 10 is provided which seats on the resilient packing ring. The valve member 11 is provided with a vertical aperture 12 therethrough and a plug 13 is threaded into the upper end of the aperture 12 and is provided with a small aperture 14 opening into the horizontal apertures 15. The upper end 16 of the plug 13 is fitted into a recess 17 provided in the cap 12 and is loosely held therein by a member 18 threaded into the recess 17. The upper surface of the end 16 is rounded as shown and this end engages the cap 10 as the valve is raised. The aperture 12 at the bottom opens into a chamber 19 in the valve member 11 and the lower end of the valve member is in the shape of a piston having a sliding fit in the cylindrical portion 20 of the housing providing a dash pot. The valve member 11 at the top is provided with a circular flange 21 fitting within the inlet opening in the valve seat 7 and normally closing the opening and this portion of the valve is provided with strengthening ribs 22 immediately beneath the flange 21 which form guides for the upper end of the valve member. Two teeth 23 are formed in the valve member 11 intermediate its ends and a tooth 24 engages between the teeth 23. This tooth 24 is formed integrally with a shaft 25 which is provided with a handle 26 by which the valve may be opened.

Figures 2, 3:
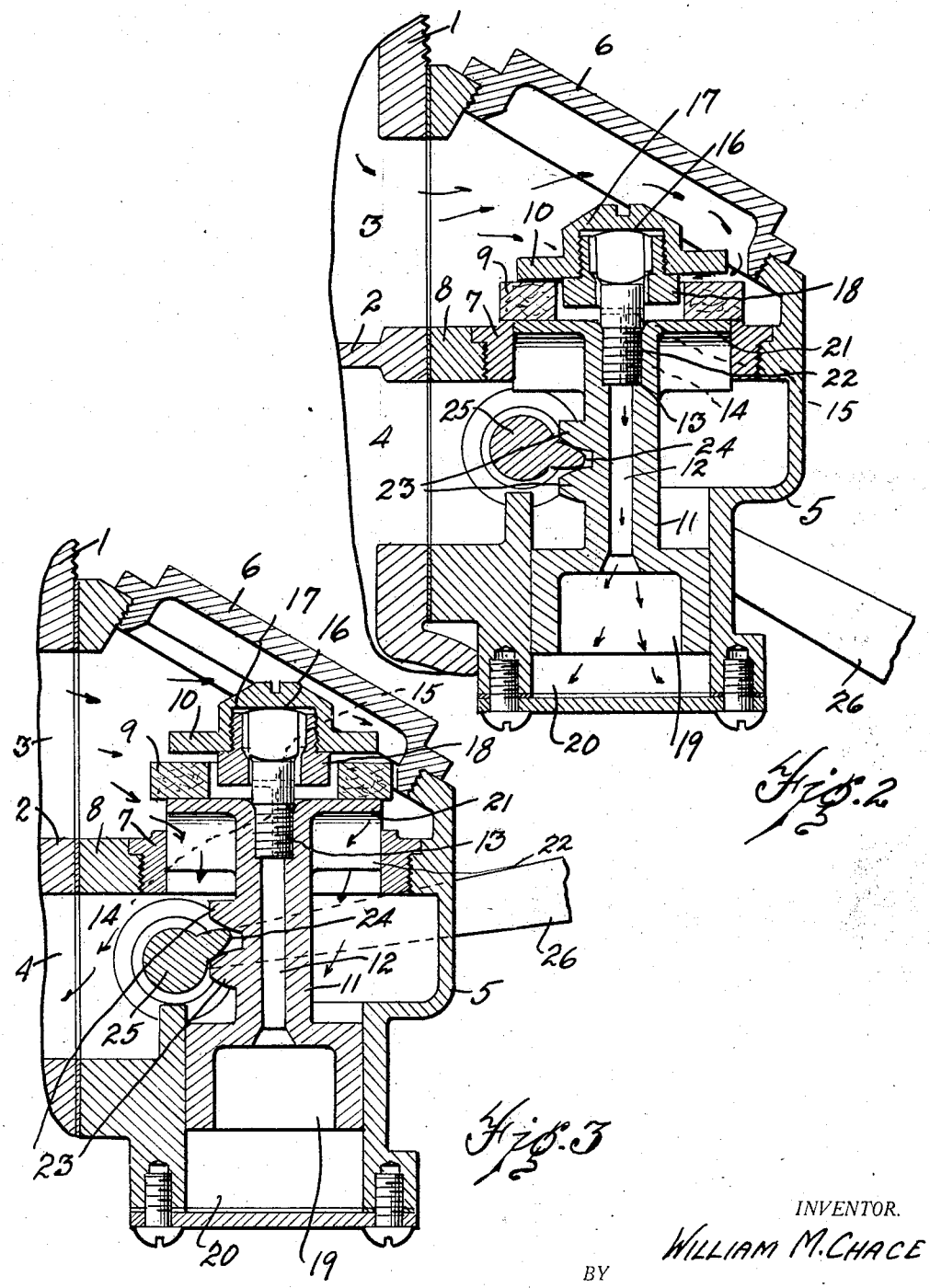
Fig. 2 is a section showing the valve as it begins to open.
Fig. 3 is a similar section showing the valve fully opened.

To open the valve the handle 26 is raised. As the valve member 11 first begins its upward movement it tends to lift the cap 10 upwardly and as this cap may tilt on the rounded end 16 of the plug 13 one side of the cap lifts away from the packing ring 9 as shown in Fig. 2. This breaks the seal of the valve and allows the water to flow inwardly in the direction of the arrows shown in Fig. 2. The water flows between the ring 9 and the member 18 and through the apertures 15 and 14 in the member 13 to fill the aperture 12 and chamber 19 at the lower end of the valve member with water under pressure. This provides pressure on both sides of the valve so that the valve may be readily opened further to any desired extent. When the valve is in use the water remains in the chamber 19 and apertures 12, 14 and 15 so that when the handle 26 is first lifted the pressure is instantly applied to the water within the valve member so that the handle may be continued in its upward movement and in practice the handle 26 may be swung from the completely closed position to the fully opened position without any check in its movement. In moving to the fully opened position the valve moves from the position shown in Fig. 2 to that shown in Fig. 3. In this movement the flange 21 is moved above the valve seat 7 allowing the water to flow beneath the flange 21 as indicated by the arrows shown in Fig. 3. It will be noted that by raising the valve member 11 to the position shown in Fig. 3 that the chamber at the bottom of the valve member 11 is enlarged and this chamber is filled as it is increased in size by water flowing through the apertures 15 and 14 in the member 3 and through the aperture 12 in the valve member. The main body of water passing through the valve as will be noted from Figs. 1 and 3 passes into the outlet chamber 4 from which it is discharged.

In former practice, self-closing valves have been adapted to be opened normally against fluid pressure by lifting a valve off a seat and then allowing the valve to be returned to the seat by the pressure, thus closing the opening. In order to prevent a sudden closing, causing a severe jar, dash pots have been fitted to retard the closing to a relatively slow speed. These dash pots have been connected by a small adjustable hole to the discharge side of the valve so that discharge liquid was sucked into the dash pot when the valve was opened and was forced out again into the discharge liquid when the valve is closed.

This arrangement had two serious disadvantages: First it required a great manual effort to open the valve against a heavy inlet pressure, and, second, the hole leading from the dash pot had to be adjusted in size for different inlet pressures; that is, the size hole suitable for retarding the valve when closing under high pressure was so small that the valve was held open under low pressure and would not close at all. Similarly, the opening suitable for low pressure would allow the valve to close with a jar under high pressure. This was remedied by manually adjusting the size of the hole and in so much as pressure variations are common, necessitated continued attention.

My invention obviates both these difficulties. When the handle is first lifted the tiltable cap raises and allows the liquid under pressure to pass to the dash pot and so balance part of the pressure on the valve. It does not balance all of it because it is desirable to always have a certain pressure tending to close the valve. For this reason the piston in the dash pot is made of smaller area than the valve itself and though the pressure per square inch is the same on the valve and in the dash pot, the greater area of the valve causes it to overcome the dash pot and so close the valve. The areas are so proportioned that the valve may be opened without undue effort. Now as the handle is raised still higher, the valve opens readily, the whole forming a continuous movement.

By removing the lifting effort from the handle, the pressure on the valve overcomes that in the dash pot and the valve starts to close. However, the liquid in the dash pot is not forced into the discharge liquid as in former practice, but into the inlet liquid which is of the same pressure as that acting on the valve, being the same liquid in fact. From this it will be seen that the difference in pressure on the valve and in the dash pot is proportional to the difference in their areas regardless of the inlet pressure. Furthermore it will be seen that these areas being of constant size, the hole joining the dash pot to the inlet liquid is of constant size and need never be adjusted. This is a great improvement on former valves as it assures a valve which always closes softly under all pressure conditions.

The valve continues its downward movement until the resilient ring 9 seats on the valve seat 7 as shown in Fig. 2 at which time the flange 21 moves downwardly away from the ring 9 when the valve is almost closed. At this time the water under pressure between the cap 10 and flange 21 within the ring 9 may escape slowly between the edge of the flange 21 and the inner diameter of the valve seat 7 to the low pressure side of the valve. This also provides an escape for the water under pressure in the dash pot at the final phase of the closing of the valve as this water is also discharged through the apertures 15 onto the top of the flange 21. This final phase in the closing movement is slower than the previous movement and as the cap 10 is finally urged to its seat by the inlet pressure the water pressure within the valve and dash pot becomes zero.

From the foregoing it will be seen that no pressure exists in the dash pot when the valve is closed so there is no slow leakage past the flange 21. Also, that only two seals exist; that between the cap and the ring 9 and that between the ring 9 and its seat, both of which are held tightly closed by the full force of the inlet pressure.

From this disclosure it will be readily seen that my valve has the following advantages: It can be easily opened; it will close positively and without jar under a wide range of inlet pressures and without adjustment therefor, and when closed is so held, tightly and positively by the inlet pressure.

From the foregoing description it becomes evident that the device is very simple and efficient in operation, will not easily get out of order and provides a device which accomplishes the objects described.

Having thus fully described my invention, its utility and mode of operation, what I claim and desire to secure by Letters Patent of the United States is—

1. In a valve, a housing having a valve seat and an inlet above the valve seat and an outlet below the valve seat opening through the side of the housing, a valve member having a flange slidably fitting the valve seat opening, a member extending upwardly from the valve member, a cap tiltably mounted on the said member above said flange, a ring normally resting on the valve seat and extending between the cap and flange, the ring being of less thickness than the space between the cap and flange, the cap normally seating on the said ring when the valve is closed, a cylindrical chamber in the lower end of the housing beneath the valve seat, the valve member being formed at the lower end to fit the said chamber and being provided with a passageway therethrough between the flange and the said chamber through which water may flow in either direction during opening or closing of the valve, and means for raising the valve member to move the flange above the valve seat and allow flow to the outlet in the side of the housing.

2. In a valve, a housing having a valve seat, a valve member having a flange slidably fitting the valve seat opening, a member extending upwardly from the valve member, a cap tiltably mounted on the said member above said flange, a ring of less thickness than the space between the flange and cap normally seating on the valve seat and the cap normally seating on the said ring when the valve is closed, a cylindrical chamber in the housing beneath the valve seat, the valve member being formed to fit the said chamber and having a recess therein open to the chamber, the valve member being provided with a passageway therethrough between the flange and the said recess through which water may flow during opening and closing of the valve and means for raising the valve member to move the flange above the valve seat.

3. In a valve, a housing having a valve seat, a ring normally seating on the valve seat, a valve member slidably mounted in relation to the seat and having a flange normally closing the inlet opening in the valve seat, a cap tiltably mounted on the valve member in spaced relation above the said flange, the space between the cap and flange being greater than the thickness of the ring, the lower end of the housing being formed to provide a cylinder and the lower end of the valve member being formed to fit the cylinder and forming an expandible chamber in combination with the cylinder, means for raising and lowering the valve member, and means whereby as the valve is opened water is admitted under pressure to the said chamber and as the valve is closed the water is discharged from the said chamber against the pressure.

4. In a valve, a housing having a valve seat, a resilient ring normally seating on the valve seat, a valve member movable axially of the valve seat and having a flange normally closing the opening in the valve seat, the valve member being provided with a longitudinal aperture, a member threaded into the upper end of the aperture and extending above the said flange and having openings therethrough in communication with the aperture in the valve member, a cap tiltably mounted on the upper end of the said threaded member and normally seating on the resilient ring when the valve is closed, a chamber at the bottom of the valve member in communication with the aperture in the valve member and means for raising and lowering the valve member.

5. In a valve, a housing having a valve seat, a ring normally engaging the said seat, a valve member, a flange on the valve member normally closing the opening in the valve seat, a cap supported on the upper end of the valve member in spaced relation with the said flange and normally seating on the said ring and closing the opening therein, the space between the cap and flange of the valve member being greater than the thickness of the ring, a cylinder in the lower end of the housing, the valve member having a part fitting the cylinder, and an inlet for the cylinder extending vertically through the valve member and opening between the cap and flange of the valve member.

6. In a valve, a housing having a valve seat, a valve member normally closing the opening in the valve seat, a member extending upwardly from the valve member, a cap tiltably mounted on the said member, a resilient ring positioned between the valve member and the cap and seating on the valve seat, the space between the valve member and cap being greater than the thickness of the resilient ring, the valve member being adapted to be raised or lowered, means for admitting water under pressure to the under side of the valve member as the valve member is raised, the said means allowing the water from the under side of the valve member to discharge to the inlet side of the valve as the valve member is lowered.

7. In a valve, a housing having a valve seat, a valve member normally closing the opening in the valve seat, a member extending upwardly from the valve member, a cap tiltably mounted on the said member, a resilient ring positioned between the valve member and cap and seating on the valve seat, the space between the valve member and cap being greater than the width of the resilient ring, means for raising and lowering the valve member and means for admitting water under pressure to the under side of the valve member as the cap is lifted off from the resilient ring.

8. In a valve, a housing having a valve seat at its upper end and a cylinder at its lower end in spaced relation with the said seat and providing an outlet therebelow for fluid flowing through the valve seat, a valve member in the housing including a ring adapted to engage the said seat, the central opening thereof being less than the diameter of the aperture through the valve seat, a flange on the valve member movable and fitting in the aperture of the valve seat adapted on movement of the valve member upwardly to engage the ring and lift the same from the seat, a cap member in the upper end of the valve member spaced from the flange a distance greater than the thickness of the ring, the cap being tiltably supported on the upper end of the valve member and adapted to seat on the ring to close the opening thereinto a flow of fluid, the housing having an inlet for fluid under pressure over the valve member whereby the valve member tends to be closed under pressure with the ring engaging the seat and the cap engaging the ring, a piston on the valve member fitting the said cylinder, a passageway opening at its lower end to the cylinder and at its upper end opening within the ring between the cap and flange and providing an inlet and an outlet for the said cylinder, a weighted lever for raising the valve member and providing a means for closing the valve member by gravity, the parts being so arranged that on raising the valve member by means of the lever fluid is first introduced into the interior of the ring and thence by the passageway to the cylinder beneath the piston thereby balancing the pressures on opposite sides of the valve member and secondly the ring is raised from its seat to permit full opening of the aperture through the valve seat.

9. In a valve, a housing having a valve seat, a valve member therein including a ring normally engaging the seat, a cap member normally seating on the ring and closing the opening therethrough, said cap member being so mounted that on raising the valve member the cap is first tilted thereby permitting fluid to flow into the space within the ring, a passageway leading from the space within the ring to the opposite end of the valve member, said opposite end being of a construction whereby fluid entering beneath the same may balance the pressure on the valve member, means on the valve member beneath the ring adapted to engage the ring on opening movement of the valve member subsequent to the tilting of the cap, said valve housing having an inlet whereby fluid under pressure may be introduced above the valve member and cap and an outlet for fluid discharging through the valve seat.

In testimony whereof, I sign this specification.

WILLIAM M. CHACE.